United States Patent
Singh et al.

(10) Patent No.: US 9,442,786 B2
(45) Date of Patent: Sep. 13, 2016

(54) DETERMINING AND CORRECTING SOFTWARE SERVER ERROR CONDITIONS

(71) Applicant: HONEYWELL INTERNATIONAL INC., Morristown, NJ (US)

(72) Inventors: Praveen Kumar Singh, Karnataka (IN); Rod Stein, Edmonton (CA); Shubhi Gogna, Karnataka (IN); Ashish Patil, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 168 days.

(21) Appl. No.: 14/302,011

(22) Filed: Jun. 11, 2014

(65) Prior Publication Data

US 2015/0363252 A1  Dec. 17, 2015

(51) Int. Cl.
G06F 11/00 (2006.01)
G06F 11/07 (2006.01)
G06F 11/34 (2006.01)

(52) U.S. Cl.
CPC ......... *G06F 11/076* (2013.01); *G06F 11/0709* (2013.01); *G06F 11/0757* (2013.01); *G06F 11/0766* (2013.01); *G06F 11/34* (2013.01); *G06F 11/079* (2013.01); *G06F 11/0748* (2013.01); *G06F 11/0793* (2013.01); *G06F 11/3495* (2013.01)

(58) Field of Classification Search
CPC ............. G06F 11/0748; G06F 11/079; G06F 11/0793; G06F 11/3495
See application file for complete search history.

(56) References Cited

U.S. PATENT DOCUMENTS

| 5,933,614 A * | 8/1999 | Tavallaei ............ G06F 11/0748 710/306 |
| 8,078,922 B2 | 12/2011 | Yordanov et al. |
| 8,122,290 B2 | 2/2012 | Walton et al. |
| 2005/0075831 A1 | 4/2005 | Ilic |
| 2010/0077440 A1* | 3/2010 | Medina ............ H04N 21/23436 725/116 |
| 2012/0284313 A1 | 11/2012 | Dunne et al. |
| 2013/0212257 A1* | 8/2013 | Murase .................. H04L 43/00 709/224 |
| 2014/0067912 A1* | 3/2014 | Vutukoori ........... G06F 11/0748 709/203 |
| 2014/0089736 A1 | 3/2014 | Okada |
| 2015/0234720 A1* | 8/2015 | Ohno .................. G06F 11/2007 714/11 |

FOREIGN PATENT DOCUMENTS

WO  0210919  2/2002

OTHER PUBLICATIONS

Amr El Zawawi, et al., "Integration of DCS and ESD through an OPC Application for Upstream Oil and Gas", Power and Energy Society General Meeting, Jul. 22-26, 2012, San Diego, CA, 2012 IEEE, pp. 1-5.

* cited by examiner

*Primary Examiner* — Charles Ehne
(74) *Attorney, Agent, or Firm* — Jetter & Associates, P.A.

(57) ABSTRACT

A system and method of diagnosing and correcting errors in a server computer. A server computer is coupled by a communication path to a client computer. A storage device stores a diagnostic error detecting and correcting program and the server computer is programmed to implement the diagnostic error detecting and correcting program. The server computer detects several selected operating parameters during operation of the server process and determines if at least a first of the selected operating parameters are outside a pre-determined specification for the selected operating parameters. In response to the selected operating parameters being outside the pre-determined specification, the server computer notifies the client computer of an error with the server process. The server computer can also detect communication errors and attempt to restore communications by modifying communication parameter(s).

20 Claims, 5 Drawing Sheets

DETERMINING AND CORRECTING SOFTWARE SERVER ERROR CONDITIONS

FIELD

Disclosed embodiments relate to computers used with industrial hardware devices and more specifically relate to diagnosing errors and correcting error conditions in a server computer.

BACKGROUND

Open Process Connectivity (OPC) is a software interface standard that allows Windows and Non-Windows programs to communicate between OPC enabled servers that have implemented an OPC server client. One area that OPC enabled servers are used is in industrial hardware devices used in manufacturing plants and refineries.

The OPC server contains a software program that converts the hardware communication protocols used by industrial hardware devices such as programmable logic controllers (PLC) into the OPC protocol. The OPC client software includes programs to connect to the industrial hardware devices such as a human-machine interface. The OPC client uses the OPC server computer to receive data and/or transmit commands to the industrial hardware devices. Each OPC enabled computer can have hundreds of server computer connections. Unfortunately, during the operation of the server computer processes, problems or errors can occur that cause the server computer to malfunction.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments comprise a method of diagnosing and correcting errors in a server process which is run on a server computer. As used herein, "software server" is a process running in a server computer system that is remote from one or more client computer systems (client computer) that is in a distributed client-server architecture model, where the client computer system and server computer system (server computer) each communicate over a computer network. The client initiates a connection to the server computer, while the server process run by the server computer waits for requests from the client. The server computer serves the client's request(s) then replies with requested data to the client.

The method includes providing a communications system including a server computer running at least one server process having non-transitory machine readable storage. The server computer includes at least one processor that is communicatively coupled by a communications path to a client computer. An algorithm for diagnosing and correcting errors with the server process is stored in the machine readable storage. The algorithm is implemented the processor causing the server computer to execute detecting a plurality of selected operating parameters during operation of the server process. The server computer determines if at least a first of the plurality of selected operating parameters (first selected operating parameter) is outside a pre-determined specification for the first selected operating parameter. In response to the first selected operating parameter being outside the pre-determined specification, the server computer notifies the client computer of an error with the server process.

One disclosed embodiment comprises a system for determining error conditions in a server computer. A server computer is communicatively coupled by a communication path to a client computer. The server computer includes a processor connected to a storage device having a non-transitory machine readable storage medium. The storage device stores a diagnostic error detecting and correcting program and the server computer is programmed to implement the diagnostic error detecting and correcting program. The server computer detects a plurality of selected operating parameters during operation of the server process and determines if at least a first of the plurality of selected operating parameters (first selected operating parameter) is outside a pre-determined specification for the first selected operating parameter. In response to the first selected operating parameter being outside the pre-determined specification, the server computer notifies the client computer of an error with the server process. The error correcting can comprise wherein if a timeout error occurs, the program increases the wait time to try and correct the error and then re-starts communications.

DETAILED DESCRIPTION

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed embodiments provide a method, system and computer program product for determining and correcting error conditions in a server computer. In accordance with a disclosed embodiment, a server computer is communicatively coupled by a communication path to a client computer. The server computer includes a processor connected to a storage device having a non-transitory machine readable storage medium. The storage device stores a diagnostic error detecting program and the server computer is programmed to implement the diagnostic error detecting program. The server computer detects a plurality of selected operating parameters during operation of the server process and determines if at least a first of the plurality of selected operating parameters (first selected operating parameter) is outside a pre-determined specification for the first selected operating parameter. In response to the first selected operating parameter being outside the pre-determined specification, the server computer notifies the client computer of an error with the server process.

Figure 1:
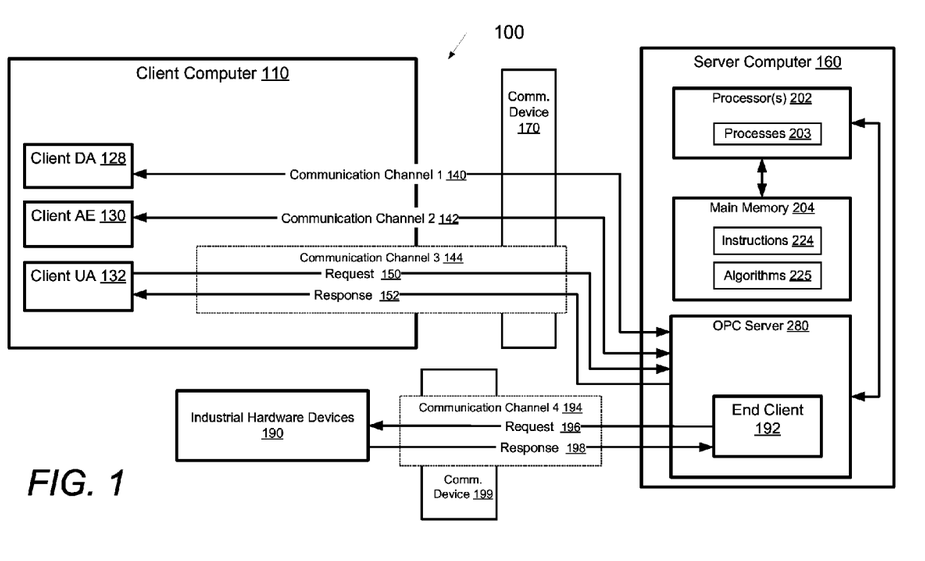
FIG. 1 is a block diagram of an example communication system, according to an example embodiment.

FIG. 1 illustrates a block diagram of an example communication system 100. As shown in FIG. 1, communication system 100 comprises a client computer system 110 that is in communication with one or more server computers shown as server computer 160 via a communication device 170. The client computer system 110 can be connected or networked to other server computers. In one embodiment, client computer system 110 and server computer 160 are OPC enabled computers that are running an OPC program. In a networked deployment, client computer system 110 can operate in the capacity of a client machine in a client-server network environment.

Server computer 160 includes one or more processors 202 such as a central processing unit (CPU) and a main memory 204, which communicate with each other via a bus. Processor 202 can run or execute one or more server processes 203. Main memory 204 can store instructions 224 and/or algorithms 225 for execution by processor 202. Communication device 170 can be selected from a wide variety of communication devices such as devices having a direct link over a serial or parallel communications bus, a wireless connection, an internet connection, a wide area network connection or a remote link through one or more switches and/or routers.

Server computer 160 is a computer system that is remote from one or more client computer systems 110 that is in a distributed client-server architecture model, where the client computer system 110 and server computer 160 each communicate over a computer network. In one embodiment, processes 203 can include an OPC server process 280 that includes one or more end clients such as the end client 192 shown as part of the OPC server process. The client initiates a connection to the server computer 160 while the server process 203 run by the server computer 160 waits for requests from the client. The server computer 160 serves the client's request(s) then replies with requested data to the client.

Client computer system 110 further includes several clients including client data access (DA) 128, client alarms and events (AE), 130 and client unified architecture (UA) 132 (collectively hereafter clients 128-132). In one embodiment, client AE 130 is an OPC alarms and events (OPC A/E) client. The OPC AE client 130 is used with process automation systems that generate alarms and events based on received process data. Clients 128-132 access and exchange information with the server computer 160.

Client computer system 110 communicates with server computer 160 via communication paths, connections or channels including communication channel 1 140 (COM/DCOM), communication channel 2 142 (COM/DCOM) and communication channel 3 144. Communication channel 1 140 communicatively couples client DA 128 to server computer 160. Communication channel 2 communicatively couples client AE 130 to server computer 160. Communication channel 3 144 communicatively couples client UA 132 to server computer 160. While three communication channels are shown, communication system 100 can include hundreds of communication channels. In one embodiment, client UA 132 can transmit requests 150 to server computer 160 via communication channel 3 144. Requests 150 can include instructions and commands for server 160. Client UA 132 can receive responses 152 from server computer 160 via communication channel 3 144. Responses 152 can include data and information from other connected devices connected to server computer 160 such as industrial hardware devices 190.

Server computer 160 further includes an OPC server 280 that includes one or more end clients 192. OPC server 280 is one of processes 203 running on processor 202. Server computer 160 communicates with industrial hardware devices 190 via communication device 199 than includes a communication channel 4 194. In one embodiment, end client 192 can transmit requests 196 to industrial hardware devices 190 via communication channel 4 194. Requests 196 can include instructions and commands for industrial hardware devices 190. End client 192 can receive responses 198 from industrial hardware devices 190 via communication channel 4 194. Responses 198 can include data and information from other industrial hardware devices 190.

Figure 2:
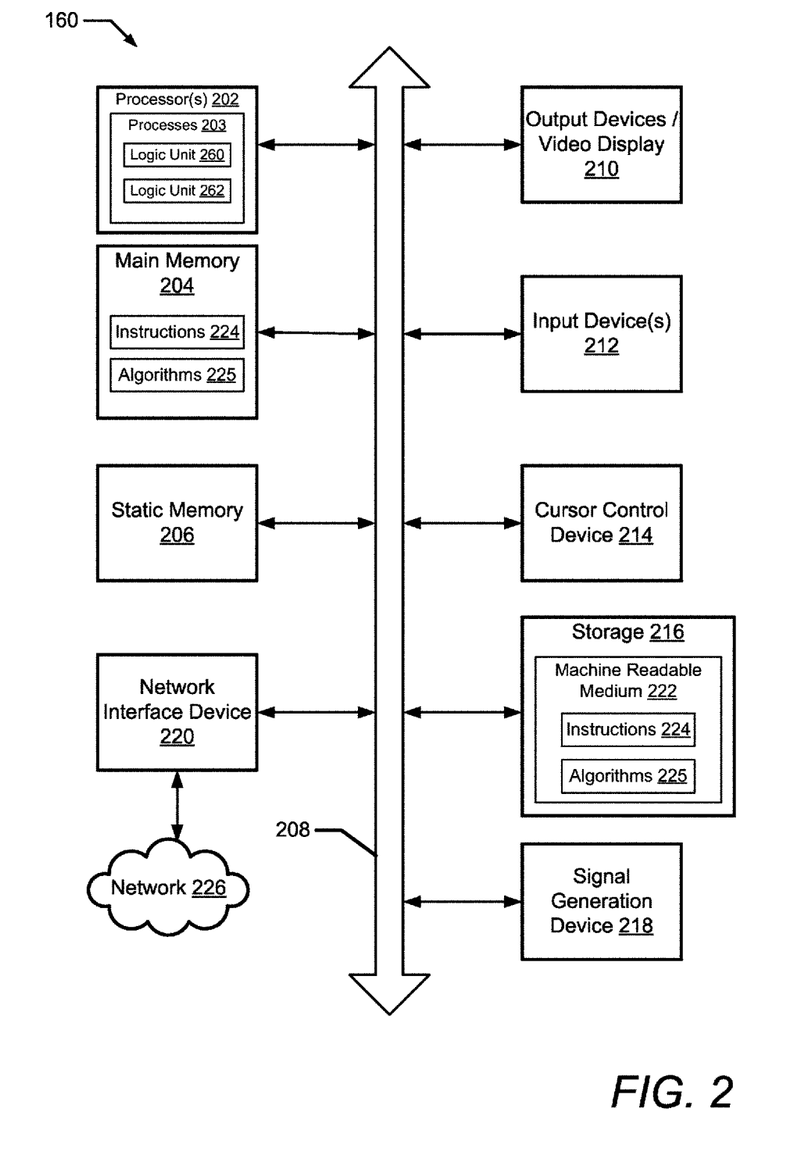
FIG. 2 is a block diagram of an example server computer system, according to an example embodiment.

FIG. 2 illustrates an example block diagram of server computer 160 within which a set of instructions 224 and/or algorithms 225 can be executed causing the server computer 160 to perform any one or more of the methods, processes, operations, applications, or methodologies discussed herein.

Server computer 160 includes one or more processors 202 such as a central processing unit (CPU), a graphics processing unit (GPU) or both, a main memory 204 and a static memory 206, which communicate with each other via a system bus 208 which can represent a data bus and an address bus. Processor 202 can run or execute one or more server processes 203. Server processes 203 can contain many sub-logic units of which sub-logic units 260 and 262 are shown. Sub-logic units 260 and 262 collectively perform the functions of processes 203. Main memory 204 can store instructions 224 and/or algorithms 225 for execution by processor 202. The server computer 160 further includes output devices/video display 210 such as a video display and a signal generation device 218 (e.g., a speaker) which are connected to system bus 208. The server computer 160 also has input devices such as an alphanumeric input device 212 (e.g., a keyboard) and a cursor control device 214 (e.g., a mouse) that are connected to system bus 208. A network interface device 220 is shown connected to an external communication network 226 to enable communication with the system bus 208.

A storage device 216 such as a hard drive or solid state drive is connected to and in communication with system bus 208. The storage device 216 includes a machine-readable medium 222 on which is stored one or more sets of software such as instructions 224 and/or algorithms 225 embodying any one or more of the methodologies or functions described herein. The instructions 224 and/or algorithms 225 can also reside, completely or at least partially, within the main memory 204 and/or within the processor 202 during execution thereof by the server computer 160. The main memory 204 and the processor 202 also containing machine-readable media. The instructions 224 and/or algorithms 225 can further be transmitted or received over network 226 via the network interface device 220.

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the computer system and that cause the computer system to perform any one or more of the methodologies shown in the various embodiments of the present invention. The term "machine-readable medium" shall accordingly be taken to include, but not be limited to, solid-state memories, optical and magnetic media, and carrier wave signals.

Figure 3:
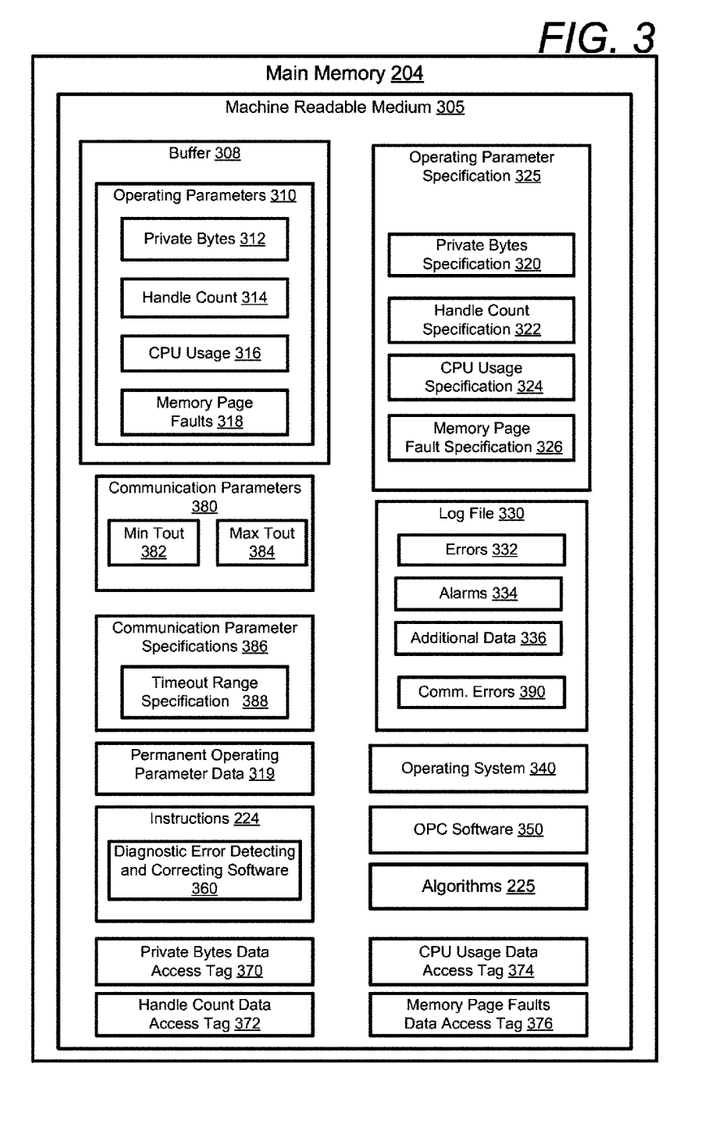
FIG. 3 is an example illustration of contents of a computer readable storage medium, according to an example embodiment.

With reference to FIG. 3, example contents of machine readable medium 305 stored within main memory 204 are shown. Machine readable medium 305 can store instructions 224 and/or algorithms 225 for execution by processor 202. Instructions 224 can include diagnostic error detecting and correcting software 360 that when executed by processor 202 determines if an error condition has occurred in server computer 160. An operating system (O/S) 340 and OPC software 350 are also stored in machine readable medium 305. Operating system (O/S) 340 manages resources and provides common services for server computer 160. The OPC software 350 enables communication with the hardware communication protocols used by industrial hardware devices such as programmable logic controllers (PLCs).

Machine readable medium 305 further includes a buffer 308 that can store one or more operating parameters 310 of server computer 160. Operating parameters 310 include one or more private bytes 312, one or more handle count 314, CPU usage 316 and one or more memory page faults 318. Operating parameters 310 are health parameters that indicate if the server computer 160 is operating correctly or is experiencing problems. Private bytes 312 is the current size, in bytes, of memory that each process 203 has allocated that cannot be shared with other processes. An increasing number of private bytes 312 are in indicator of memory leak. Handle count 314 is a count of the number of handles associated with each process 203.

A handle is a reference that points to a system resource. A handle allows system resources to know what resource is referring to when it is passed in an API call. An increasing number of handle counts 314 is in indicator of handle leak. A handle leak is a type of software bug that occurs when a computer program asks for a handle to a resource but does not free the handle when it is no longer used. CPU usage 316 is a measure of the amount or percentage used of processor 202. Memory page faults 318 are the number of page faults associated with each process 203. A page fault occurs when a program requests an address on a page that is not in the current set of memory resident pages. When this occurs, the process that experienced the page fault is put into a wait state while the operating system finds the specific page on disk and restores it to physical memory.

Machine readable medium 305 further can store permanent operating parameter data 319. Permanent operating parameter data 319 is operating parameters 310 that have been stored to permanent storage from temporary storage in buffers 308.

Machine readable medium 305 further can store operating parameter specifications 325. Operating parameter specifications 325 include private bytes specification 320, handle count specification 322, CPU usage specification 324 and memory page fault specification 326. Private bytes specification 320 is the value or range of private bytes 312 that indicates an error condition such as a memory leak. In one embodiment, if the value of private bytes 312 is greater than the value of private bytes specification 320, a memory leak is determined to have occurred for a process.

Handle count specification 322 is the value or range of handle count 314 that indicates an error condition such as a handle leak. In one embodiment, if the value of handle count 314 is greater than the value of handle count specification 322, a handle leak is determined to have occurred for a process. CPU usage specification 324 is the value or range of CPU usage 316 that indicates an error condition in server computer 160. In one embodiment, if the value of CPU usage 316 is greater than the value of CPU usage specification 324, a CPU usage error condition is determined to have occurred for a process. Memory page fault specification 326 is the value or range of memory page faults 318 that indicates an error condition in server computer 160. In one embodiment, if the value of memory page faults 318 is greater than the value of memory page fault specification 326, a memory page fault error condition is determined to have occurred for a process.

Machine readable medium 305 further can store a log file 330. Log file 330 can contain and store errors 332, alarms 334, additional data 336 and communication errors 390. Errors 332 correspond to the error conditions detected by diagnostic error detecting and correcting software 360 during the operation of server computer 160. When the error condition occurs, a record of the error 332 is stored in log file 330. Alarms 334 correspond to the alarms or notifications generated by diagnostic error detecting and correcting software 360 during the operation of server computer 160. When an alarm is generated, a record of the alarm 334 is stored in log file 330. Additional data 336 is any additional operating parameters or data of server computer 160 that a user has pre-determined to be stored to log file 330. Communication errors 390 occur on communication channels 140-144 during communication between client computer 110 and server computer 160.

Machine readable medium 305 also can store private bytes data access tags 370, handle count data access tags 372, CPU usage data access tags 374 and memory page fault data access tags 376. Data access tags 370-376 represents details of error conditions associated with operating parameters 310.

Machine readable medium 305 further can store communication parameters 380 and communication parameter specifications 386. Communication parameters 380 are parameters associated with communications between server computer 160 and industrial hardware devices 190 that are facilitated by communication device 199. In one embodiment, communication parameters 380 can include a minimum timeout time 382 and a maximum timeout time 384. Communication parameter specifications 386 are threshold (minimum/maximum) values allowed for communication parameters 380. In one embodiment, communication parameter specifications 386 can include a timeout range specification 388. The timeout times are time periods that server computer 160 waits to acknowledge receipt of a request 196 or response 198 from industrial hardware devices 190. In one embodiment, server computer 160 can close a client communication connection or channel (i.e., channel 4 194) after a certain period of inactivity (i.e. exceeding timeout range specification 388) in order to ensure that communication connections do not persist forever.

Figure 4:
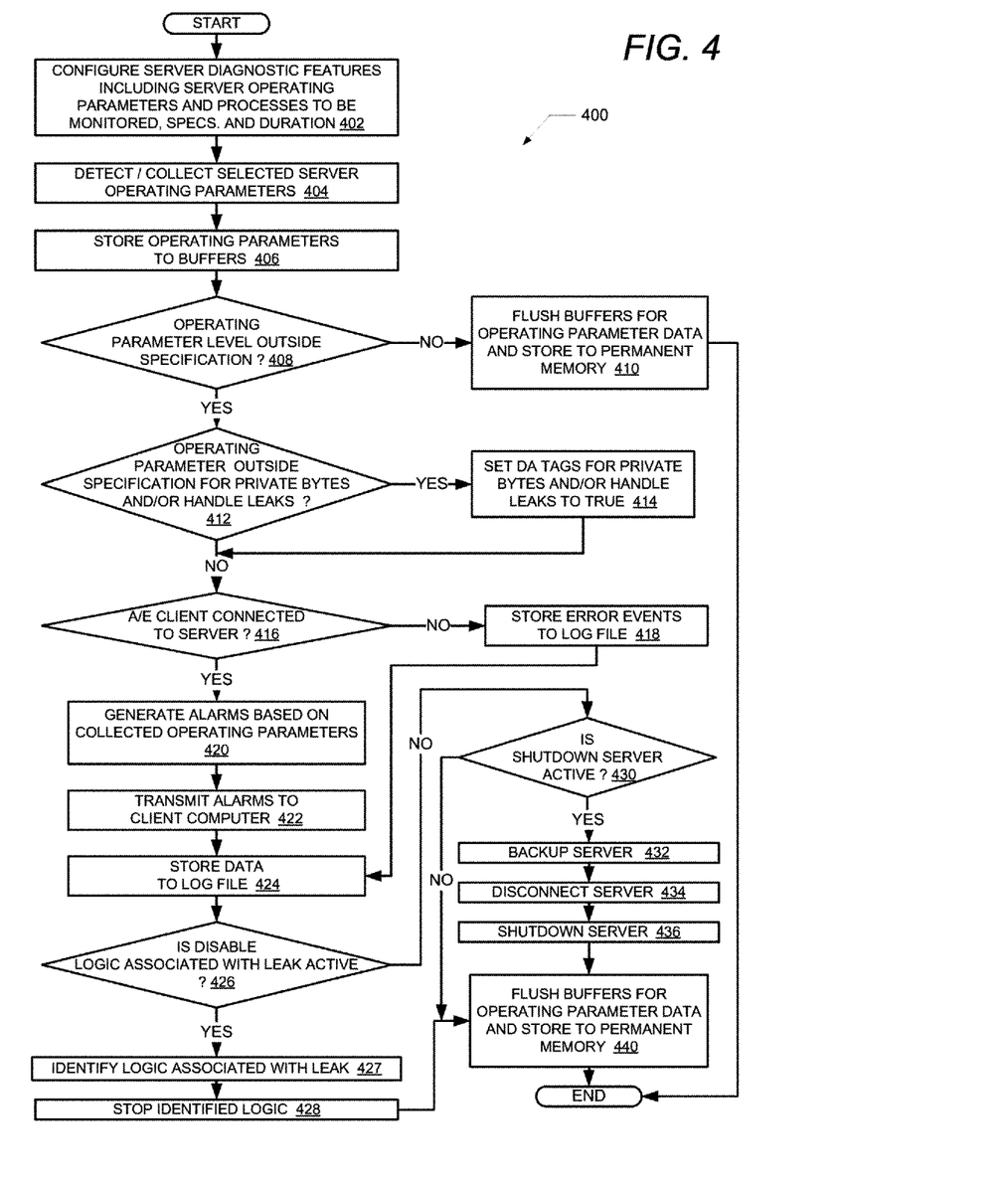
FIG. 4 is a flow chart that shows steps in an example method of determining and correcting error conditions in a server computer, according to an example embodiment.

FIG. 4 is a flow chart showing steps in an exemplary method 400 for determining if an error condition has occurred in a server computer 160, according to an example embodiment. With reference to FIGS. 1-4, method 400 can be implemented via the execution of instructions 224 and/or algorithms 225 by processor 202 within the server computer 160 and specifically by the execution of diagnostic error detecting and correcting software 360 by processor 202.

Method 400 begins at the start block and proceeds to block 402. At block 402, processor 202 configures server computer 160 to monitor operating parameters 310 in comparison to operating parameter specifications 325 and sets a duration of the monitoring. Processor 202 detects, monitors and collects one or more selected operating parameters 310 (i.e. private bytes 312, handle count 314, CPU usage 316 and memory page faults 318) at block 404. Processor 202 stores the detected operating parameters 310 to buffer 308 at block 406. Processor 202 determines if one or more of the operating parameters 310 are outside of the corresponding operating parameter specification 325 (i.e. private bytes specification 320, handle count specification 322, CPU usage specification 324 and memory page fault specification 326) at decision block 408.

In response to the operating parameters 310 not being outside of the corresponding operating parameter specification 325, processor 202 stores the operating parameters 310 to permanent operating parameter data 319 and then flushes the buffers 308 at block 410. Method 400 then ends. In response to one or more of the operating parameters 310 being outside of the corresponding operating parameter specification 325, processor 202 determines if the operating parameter outside the specification is a private bytes 312 and/or handle count 314 at decision block 412.

In response to the operating parameters being outside the specification is a private byte 312 and/or handle count 314 at decision block 412, processor 202 sets a corresponding private bytes data access tag 370 for private bytes 312 and/or handle count data access tag 372 for handle count 314 and/or CPU usage data access tag 374 for CPU usage 316 and/or memory page fault data access tag 376 for memory page faults 318 to true at block 414. After block 414 and in response to the operating parameter outside the specification not being a private byte 312 and/or handle count 314 from decision block 412, processor 202 determines if an alarm and event (A/E) client (i.e. client AE 130) is connected to server computer 160 at decision block 416.

In response to the alarm and event client being connected to server computer 160, processor 202 generates one or more alarms 334 (block 420) and notifies or transmits the alarms 334 to the client AE 130 of client computer 110 (block 422). After either block 418 or 422 have completed, processor 202 stores operating parameters 310 and/or alarms 334 to log file 330 at block 424.

At decision block 426, processor 202 determines if a disable option or operation to inactivate the core sub-logic units 260 or 262 in processes 203 associated with a leak is active within server computer 160. In response to the disable operation to inactive core sub-logic units 260 or 262 associated with a leak being active, processor 202 identifies the specific sub-logic units 260 or 262 associated with the memory or handle leaks (block 427) and inactivates the identified sub-logic units 260 or 262 (block 428). Method 400 then ends.

In response to the disable operation to terminate processes associated with a leak not being active, processor 202 determines if a shutdown server option is active within server computer 160 (block 430). In response to the shutdown server option not being active, processor 202 stores the operating parameters 310 to permanent operating parameter data 319 and flushes the buffers 308 at block 440. Method 400 then ends.

In response to the shutdown server option being active, processor 202 performs a backup operation on server computer 160 (block 432). The backup operation copies and stores computer data to be used to restore server computer 160 during a restart. Processor 202 disconnects server computer 160 from client computer 110 at block 434 and triggers server computer 160 to shutdown (block 436). Processor 202 stores the operating parameters 310 to permanent operating parameter data 319 and flushes the buffers 308 at block 440. Method 400 then ends.

Method 400 allows for a system and method of diagnosing and correcting errors in a server process. Diagnostic error detecting and correcting software 360 diagnoses errors 332 with the server computer 160. Selected operating parameters 310 are monitored during operation of the server process 203 and compared to pre-determined operating parameter specifications 325. If the selected operating parameter is outside the specification, the server computer 160 notifies the client AE 130 of an error by transmitting an alarm 334.

Figure 5:
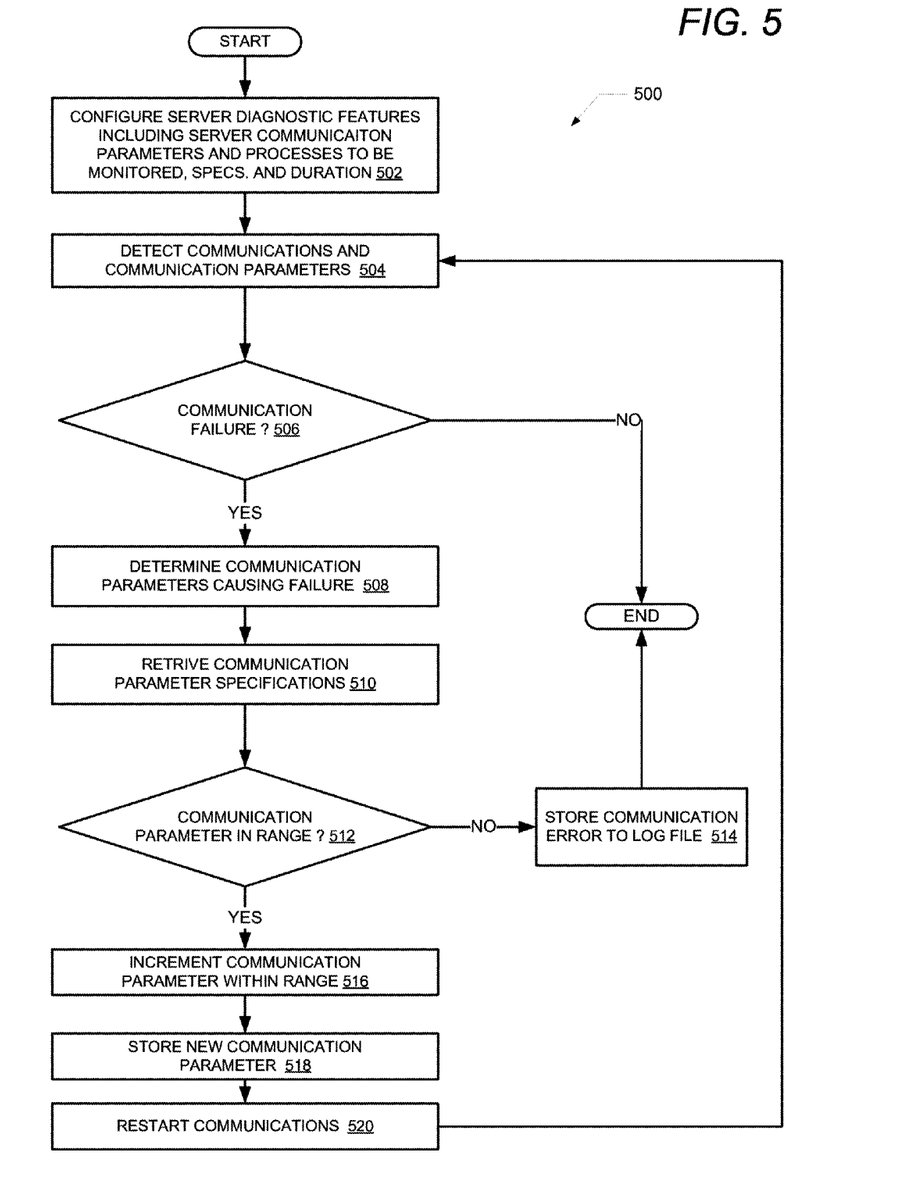
FIG. 5 is a flow chart that shows steps in an example method of determining and correcting communication error conditions in a server computer, according to an example embodiment.

FIG. 5 is a flow chart showing steps in an exemplary method 500 for determining if a communication error condition has occurred in server computer 160, and correcting the error, according to an example embodiment. With reference to FIGS. 1-5, method 500 can be implemented via the execution of instructions 224 and/or algorithms 225 by processor 202 within the server computer 160 and specifically by the execution of diagnostic error detecting and correcting software 360 by processor 202. Method 500 begins at the start block and proceeds to block 502. At block 502, processor 202 configures server computer 160 to monitor communication parameters 380 and sets a duration of the monitoring. Processor 202 detects communications on communication channel 4 194 and detects one or more selected communication parameters 380 (i.e. minimum timeout time 382 and maximum timeout time 384) at block 504. Processor 202 determines if a communication failure has occurred on communication channel 4 194 at decision block 506.

In response to a communication failure not occurring, method 500 ends. In response to a communication failure occurring, processor 202 determines the specific communication parameter 380 causing the communication failure (block 508). Processor 202 retrieves communication parameter specifications 386 (i.e. timeout range specification 388) (block 510). At decision block 512, Processor 202 determines if the communication parameters 380 (i.e. minimum timeout time 382 and maximum timeout time 384) are within the corresponding communication parameter specifications 386 (i.e. within timeout range specification 388).

In response to the communication parameters 380 not being within the corresponding communication parameter specifications 386, processor 202 stores the communication errors 390 to log file 330 (block 514). Method 500 then terminates. In response to the communication parameters 380 being within the corresponding communication parameter specifications 386 (i.e. within timeout range specification 388), processor 202 increments one or more of the communication parameters 380 (i.e. minimum timeout time 382 and/or maximum timeout time 384) at block 516 and stores the new communication parameters 380 to machine readable medium 305 (block 518). Processor 202 then restarts communications between server computer 160 and industrial hardware devices 190 (block 520). Method 500 then returns to block 504 where processor 202 continues to detect communications on communication channel 4 194 and communication parameters 380.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

The invention claim is:

1. A method, comprising:
   providing a communications system including a server computer running at least one server process having non-transitory machine readable storage, said server computer including at least one processor communicatively coupled by a communications path to a client computer, wherein an algorithm for diagnosing errors with said server process is stored in said machine readable storage, said algorithm implemented by said processor causing said server computer to execute:
   detecting a plurality of selected operating parameters including a first selected operating parameter during operation of said server process;
   storing the plurality of selected operating parameters in a buffer;
   determining if the first selected operating parameter is outside a pre-determined specification for said first selected operating parameter,
   in response to said first selected operating parameter being outside the pre-determined specification, said server computer notifying said client computer of an error with said server process, and correcting the error.

2. The method of claim 1, wherein in response to said determining finding said first selected operating parameter is not being outside said pre-determined specification, flushing the buffer containing said plurality of selected operating parameters and storing said plurality of selected operating parameters to permanent storage.

3. The method of claim 1, wherein said plurality of selected operating parameters include at least one of a private byte value, a handle count value, a processor usage value and a memory page fault value.

4. The method of claim 1, further comprising:
   in response to said first selected operating parameter being outside said pre-determined specification, identifying if said first selected operating parameter is either a private byte value or a handle count value;
   wherein when said first selected operating parameter is said private byte value, setting a data access tag for a memory leak to true; and
   wherein when said first selected operating parameter is said handle count value, setting a data access tag for a handle leak to true.

5. The method of claim 1, further comprising:
   determining if said client computer includes an alarm and event client and
   in response to said client computer including said alarm and event client, generating an alarm for said notifying said client computer.

6. The method of claim 1, further comprising:
   determining if said client computer includes an alarm and event client; and
   in response to said client computer not including said alarm and event client, storing said first selected operating parameter when outside said pre-determined specification to a log file.

7. The method of claim 5, further comprising:
   storing said alarm to a log file.

8. The method of claim 1, further comprising:
   determining if a request for additional data from said client computer has been received, and
   in response to determining that said request for additional data has been received, storing said plurality of selected operating parameters to a log file.

9. The method of claim 1, further comprising:
   determining if a communication failure has occurred;
   in response to determining that said communication failure has occurred, determining if at least one communication parameter is within a communication parameter specification; and
   in response to determining said at least one communication parameter is within said communication parameter specification, incrementing said at least one communication parameter.

10. A computer program product, comprising:
    a non-transitory data storage medium that includes program instructions executable by a processor to enable said processor to execute a method of diagnosing errors in a server computer running at least one server process, said server computer communicatively coupled by a communication path to a client computer, said computer program product comprising:
    code for detecting a plurality of selected operating parameters including a first selected operating parameter during operation of said server process;
    code for storing the plurality of selected operating parameters in a buffer;
    code for determining if the first selected operating parameter is outside a pre-determined specification for said first selected operating parameter,
    code for in response to said first selected operating parameter being outside the pre-determined specification, said server computer notifying said client computer of an error with said server process, and correcting the error.

11. The computer program product of claim 10, wherein in response to said determining finding said first selected operating parameter not being outside said pre-determined specification, said computer program product further comprises code for flushing the buffer containing said plurality of selected operating parameters and code for storing said plurality of selected operating parameters to permanent storage.

12. The computer program product of claim 10, wherein said plurality of selected operating parameters include at least one of a private byte value, a handle count value, a processor usage value and a memory page fault value.

13. The computer program product of claim 10, wherein said computer program product further comprises code for:
   in response to said first selected operating parameter being outside said pre-determined specification, code for identifying if said first selected operating parameter is either a private byte value or a handle count value;
   wherein when said first selected operating parameter is said private byte value, code for setting a data access tag for a memory leak to true; and
   wherein when said first selected operating parameter is said handle count value, code for setting a data access tag for a handle leak to true.

14. The computer program product of claim 10, wherein said computer program product further comprises code for:
   determining if said client computer includes an alarm and event client; and
   in response to said client computer including said alarm and event client, code for generating an alarm for said notifying said client computer.

15. The computer program product of claim 10, wherein said computer program product further comprises code for:
   determining if said client computer includes an alarm and event client; and
   in response to said client computer not including said alarm and event client, code for storing said first selected operating parameter when outside said pre-determined specification to a log file.

16. The computer program product of claim 10, wherein said computer program product further comprises code for:
   determining if a communication failure has occurred;
   in response to determining that said communication failure has occurred, determining if at least one communication parameter is within a communication parameter specification; and
   in response to determining said at least one communication parameter is within said communication parameter specification, incrementing said at least one communication parameter.

17. A system for determining error conditions in a server computer comprising:
   said server computer running at least one server process communicatively coupled by a communication path to a client computer; said server computer including a processor connected to a storage device having a non-transitory machine readable storage medium; wherein said storage device stores a diagnostic error detecting program and said server computer is programmed to implement said diagnostic error detecting program, and wherein said server computer:
   detects a plurality of selected operating parameters including a first selected operating parameter during operation of said server process;
   stores the plurality of selected operating parameters in a buffer;
   determines if the first selected operating parameter is outside a pre-determined specification for said first selected operating parameter,
   in response to said first selected operating parameter being outside the pre-determined specification, said server computer notifies said client computer of an error with said server process, and
   corrects the error.

18. The system of claim 17, wherein in response to said determining finding said first selected operating parameter is not being outside said pre-determined specification, said server computer flushes the buffer containing said plurality of selected operating parameters and storing said plurality of selected operating parameters to permanent storage.

19. The system of claim 17, wherein said plurality of selected operating parameters include at least one of a private byte value, a handle count value, a processor usage value and a memory page fault value.

20. The system of claim 17, further comprising:
   in response to said first selected operating parameter being outside said pre-determined specification, said server computer identifies if said first selected operating parameter is either a private byte value or a handle count value;
   wherein when said first selected operating parameter is said private byte value, said server computer sets a data access tag for a memory leak to true; and
   wherein when said first selected operating parameter is said handle count value, said server computer sets a data access tag for a handle leak to true.

* * * * *